United States Patent [19]
Will

[11] Patent Number: 5,905,789
[45] Date of Patent: May 18, 1999

[54] CALL-FORWARDING SYSTEM USING ADAPTIVE MODEL OF USER BEHAVIOR

[75] Inventor: Craig Alexander Will, Fremont, Calif.

[73] Assignee: Northern Telecom Limited, Quebec, Canada

[21] Appl. No.: 08/806,861

[22] Filed: Feb. 26, 1997

Related U.S. Application Data

[63] Continuation-in-part of application No. 08/726,604, Oct. 7, 1996.

[51] Int. Cl.$^6$ .................................................. H04M 3/46
[52] U.S. Cl. ............................................. 379/211; 379/201
[58] Field of Search .................................. 379/211, 355, 379/356, 265, 266, 309, 201, 219, 220, 221

[56] References Cited

U.S. PATENT DOCUMENTS

| | | | |
|---|---|---|---|
| 3,742,143 | 6/1973 | Awipi | 379/355 |
| 4,313,035 | 1/1982 | Jordan et al. | 379/207 |
| 4,348,550 | 9/1982 | Pirz et al. | 379/357 |
| 4,593,157 | 6/1986 | Usdan | 379/88 |
| 4,731,811 | 3/1988 | Dubus | 379/88 |
| 4,737,976 | 4/1988 | Borth et al. | 379/81 |
| 4,754,951 | 7/1988 | Konneker | 266/47 |
| 4,827,500 | 5/1989 | Binkerd et al. | 379/88 |
| 4,829,576 | 5/1989 | Porter | 381/43 |
| 4,853,953 | 8/1989 | Fujisaki | 379/88 |
| 4,864,622 | 9/1989 | Iida et al. | 381/41 |
| 4,924,496 | 5/1990 | Figa et al. | 379/142 |
| 4,928,302 | 5/1990 | Kaneuchi et al. | 379/88 |
| 4,945,557 | 7/1990 | Kaneuchi et al. | 379/67 |
| 4,959,850 | 9/1990 | Marui . | |
| 4,959,855 | 9/1990 | Daudelin . | |
| 4,961,212 | 10/1990 | Marui et al. | 379/67 |
| 4,979,206 | 12/1990 | Padden et al. | 379/67 |
| 5,007,081 | 4/1991 | Schmuckal et al. | 379/354 |
| 5,018,201 | 5/1991 | Sugawara | 381/43 |
| 5,042,063 | 8/1991 | Sakanishi et al. | 379/88 |

(List continued on next page.)

FOREIGN PATENT DOCUMENTS

| | | |
|---|---|---|
| 0 269 364 A2 | 6/1988 | European Pat. Off. . |
| 0 408 041 A2 | 1/1991 | European Pat. Off. . |
| 0 431 890 A2 | 12/1991 | European Pat. Off. . |
| 0 477 854 A2 | 1/1992 | European Pat. Off. . |
| 0 493 292 A2 | 1/1992 | European Pat. Off. . |
| 06014098 | 1/1994 | European Pat. Off. . |
| 0 647 075 A2 | 4/1995 | European Pat. Off. . |
| 07282203 | 10/1995 | European Pat. Off. . |
| 07283858 | 10/1995 | European Pat. Off. . |
| 07320001 | 12/1995 | European Pat. Off. . |
| 0 709 996 A2 | 1/1996 | European Pat. Off. . |

(List continued on next page.)

OTHER PUBLICATIONS

Mark Fanty et al., "City Name Recognition Over The Telephone," pp. I–549–I552, 0–7803–0946–4/93, Apr. 27, 1993, IEEE.

Rumelhart, David E., et al., Parallel Distributed Processing; Explorations in the Microstructure of Cognition, Chapter 8: "Learning Internal Representations by Error Propagation," vol. 1: Foundations, 1986, pp. 318–362.

(List continued on next page.)

*Primary Examiner*—Krista Zele
*Assistant Examiner*—Scott Wolinsky
*Attorney, Agent, or Firm*—Finnegan, Henderson, Farabow, Garrett & Dunner

[57] ABSTRACT

Subscribers to a personal telephone number service can receive calls placed to telephone numbers associated with an individual rather than a physical location or telephone line. A subscriber predefines a set of telephone numbers for telephones at locations frequented by the subscriber. When a call to a subscriber's personal telephone number is received, a model of the subscriber's behavior predicts the likelihood of the subscriber being at different locations, and the call is forwarded to a telephone at the most likely location, given the current day of the week and time of the day. The model is trained using data obtained by cases in which a caller calling the personal telephone number is successful in locating the subscriber.

43 Claims, 7 Drawing Sheets

U.S. PATENT DOCUMENTS

| | | | |
|---|---|---|---|
| 5,054,053 | 10/1991 | Sakanishi et al. | 379/88 |
| 5,111,501 | 5/1992 | Shimanuki | 379/355 |
| 5,155,763 | 10/1992 | Bigus et al. | 379/113 |
| 5,163,081 | 11/1992 | Wycherley et al. | 379/88 |
| 5,165,095 | 11/1992 | Borcherding | 379/88 |
| 5,168,548 | 12/1992 | Kaufman et al. | 704/200 |
| 5,181,237 | 1/1993 | Dowden et al. | 379/88 |
| 5,182,765 | 1/1993 | Ishii et al. | 379/88 |
| 5,185,781 | 2/1993 | Dowden et al. | 379/67 |
| 5,187,735 | 2/1993 | Herrero Garcia et al. | |
| 5,204,894 | 4/1993 | Darden | 379/88 |
| 5,222,121 | 6/1993 | Shimada | 379/88 |
| 5,230,017 | 7/1993 | Alexander | 379/140 |
| 5,243,645 | 9/1993 | Bissell et al. | 379/211 |
| 5,267,308 | 11/1993 | Jokinen et al. | 379/354 |
| 5,274,699 | 12/1993 | Ranz | 379/142 |
| 5,301,227 | 4/1994 | Kamei et al. | 379/88 |
| 5,313,516 | 5/1994 | Afshar et al. | 379/67 |
| 5,315,649 | 5/1994 | Foster et al. | 379/355 |
| 5,325,421 | 6/1994 | Hou et al. | 379/67 |
| 5,329,578 | 7/1994 | Brennan et al. | 379/88.19 |
| 5,333,184 | 7/1994 | Doherty et al. | 379/115 |
| 5,335,261 | 8/1994 | Fujinaka | 379/67 |
| 5,353,330 | 10/1994 | Fujiwara | 379/67 |
| 5,353,336 | 10/1994 | Hou et al. | 379/67 |
| 5,357,596 | 10/1994 | Takebayashi et al. | 379/355 |
| 5,369,685 | 11/1994 | Kero | 379/67 |
| 5,371,779 | 12/1994 | Kobayashi | 379/68 |
| 5,392,342 | 2/1995 | Rosenthal | 379/211 |
| 5,394,464 | 2/1995 | Hanson et al. | 379/201 |
| 5,398,279 | 3/1995 | Frain | 379/140 |
| 5,414,759 | 5/1995 | Ishikuri et al. | 379/88.19 |
| 5,430,791 | 7/1995 | Feit et al. | 379/88.01 |
| 5,452,340 | 9/1995 | Engelbeck et al. | 379/67 |
| 5,452,397 | 9/1995 | Ittycheriah et al. | 704/240 |
| 5,465,401 | 11/1995 | Thompson | 379/357 |
| 5,467,383 | 11/1995 | Urasaka et al. | 379/61 |
| 5,479,488 | 12/1995 | Lennig et al. | 379/67 |
| 5,479,489 | 12/1995 | O'Brien | 379/67 |
| 5,483,579 | 1/1996 | Stogel | 379/88 |
| 5,487,111 | 1/1996 | Slusky | 379/211 |
| 5,488,652 | 1/1996 | Bielby et al. | 379/88 |
| 5,509,058 | 4/1996 | Sestak et al. | 379/201 |
| 5,509,103 | 4/1996 | Wang | 704/232 |
| 5,524,145 | 6/1996 | Parker | 379/197 |
| 5,553,125 | 9/1996 | Martensson | 379/140 |
| 5,568,546 | 10/1996 | Marutiak | 379/355 |
| 5,581,611 | 12/1996 | Yunoki | 379/211 |
| 5,583,564 | 12/1996 | Rao et al. | 348/14 |
| 5,592,546 | 1/1997 | Takahashi | 379/355 |
| 5,600,704 | 2/1997 | Ahlberg et al. | 455/445 |
| 5,638,425 | 6/1997 | Meador, III et al. | 379/88 |
| 5,642,411 | 6/1997 | Theis | 379/265 |
| 5,668,862 | 9/1997 | Bannister et al. | 379/211 |
| 5,684,868 | 11/1997 | Alexander | 379/140 |
| 5,706,339 | 1/1998 | Eisdorfer et al. | 379/211 |
| 5,712,957 | 1/1998 | Waibel et al. | 704/240 |
| 5,717,738 | 2/1998 | Gammel | 379/67 |
| 5,719,921 | 2/1998 | Vysotsky et al. | 379/88 |
| 5,724,411 | 3/1998 | Eisdorfer et al. | 379/211 |
| 5,742,674 | 4/1998 | Jain et al. | 379/207 |

FOREIGN PATENT DOCUMENTS

| | | |
|---|---|---|
| 3837385 A1 | 5/1989 | Germany . |
| 06121014 | 4/1994 | Japan . |
| 07095279 | 7/1995 | Japan . |
| 07336426 | 12/1995 | Japan . |
| 2 293 521 | 3/1996 | United Kingdom . |
| 2 292 043 | 7/1996 | United Kingdom . |
| 2315191 | 1/1998 | United Kingdom . |
| WO 87/07460 | 12/1987 | WIPO . |
| WO 94/14270 | 6/1994 | WIPO . |
| WO 96/07286 | 3/1996 | WIPO . |
| WO 96/38971 | 12/1996 | WIPO . |
| WO 97/19546 | 5/1997 | WIPO . |
| WO 97/37499 | 10/1997 | WIPO . |

OTHER PUBLICATIONS

Rosenberg, A.E. and Schmidt, C.E., The Bell System Technical Journal, "Automatic Recognition of Spoken Spelled Names for Obtaining Directory Listings," Oct. 1979, pp. 1797–1823.

Rabiner, L.R., et al., The Bell System Technical Journal, "A Voice–Controlled, Repertory–Dialer System," Sep. 1980, pp. 1153–1163.

VCS 2030 2060 Voice Dialer User Manual, pp. 1–17, undated.

Voice Dial Information HTTP://www.swbell.com/swbell/shortsub/voice dial.html, undated.

"Bell Atlantic Nynex Mobile Debuts Unique Voice Dialing Service, Talkdial," Bell Atlantic News Release, Feb. 15, 1996.

| DATE OF CALL ~510 | DAY OF WEEK ~520 | TIME OF DAY ~530 | NUMBER ~540 | DURATION OF CALL ~550 |
|---|---|---|---|---|
| 12-25-96 ~560 | 2 | 4 | 703-846-1957 | 2 |
| | | | | |
| | | | | |
| | | | | |

CALL-FORWARDING SYSTEM USING ADAPTIVE MODEL OF USER BEHAVIOR

RELATED APPLICATIONS

This is a continuation-in-part application under 37 C.F.R. § 1.60 of U.S. application Ser. No. 08/726,604, filed Oct. 7, 1996, entitled "VOICE-DIALING SYSTEM USING ADAPTIVE MODEL OF CALLING BEHAVIOR."

BACKGROUND OF THE INVENTION

1. Field of the Invention

This invention relates generally to systems for telephonic communications and, more particularly, to a method and apparatus for determining an optimum sequence of telephone numbers to forward calls that have been made to a personal telephone number. The invention further relates to systems based on artificial intelligence techniques, particularly those using knowledge processing, and especially to adaptive or trainable systems that create sets of rules and use parallel distributed processing components.

2. Description of the Related Art

Telecommunication service companies have begun to experiment with systems that employ "personal telephone numbers." Personal telephone numbers are assigned to individuals rather than to specific physical telephone instruments. When a call is made to an individual's personal telephone number, the call is forwarded to a telephone instrument at one of a number of locations depending upon the whereabouts of the individual at a particular time. The primary difficulty in effectively implementing personal telephone numbers involves accurately determining to which physical telephone instrument to forward calls.

Several approaches have been suggested for addressing this problem. These approaches can be categorized into the "find me" and "follow me" methodologies. Systems employing the "find me" approach typically forward calls to a personal telephone number to telephone instruments according to a preset sequence and until the subscriber is located. The "follow me" systems forward calls to a personal telephone number to telephone instruments according to recent activity of the subscriber.

For example, Jordan et al. (U.S. Pat. No. 4,313,035) proposes a system for keeping track of the location of the individual and routing calls to the telephone where the individual can be found at a particular time, or indicating to the caller that the individual is in transit between locations. One significant problem with this system is that it requires the individual to make a call to update a system database whenever he changes location.

Bissell et al. suggests another solution in U.S. Pat. No. 5,243,645. This patent discloses a system that forwards calls made to a personal telephone number (or to an ordinary number) based on information obtained when an individual subscriber engages in an activity, such as credit card calls, credit card transactions, or automated teller transactions, that indicates his location. When such an activity is performed, the location of the individual, potentially including the telephone number, is recorded in a database that tracks the location of the subscriber. Calls can then be forwarded to the specific telephone number associated with the last known location of the subscriber, or to the telephone number in the subscriber's defined list of calls that is nearest to the last known location as indicated by the area code, cellular region, paging area, etc.

One problem with this solution is that it provides a forwarding location for calls to a personal telephone number that may be available for only a limited time. The new number is valid only as long as the subscriber stays at the location where he performed that activity.

There are also many difficulties in building such a system, including problems of integrating and coordinating databases and communications systems built for different purposes. For example, systems managing credit card transactions must notify the call-forwarding system of a subscriber's whereabouts when the subscriber engages in a transaction using his credit card. This requires the credit card system to store information of call-forwarding subscribers and notify the call-forwarding service when the credit card transaction takes place.

Another way to resolve the call-forwarding dilemma is proposed by Brennan et al. in U.S. Pat. No. 5,329,578. This patent discloses a system that routes calls to a personal telephone number to physical locations of telephone instruments according to information in a "service profile" set up by the subscriber. The subscriber defines a sequence of numbers to locate the subscriber. Call routing thus depends on a schedule specified by the subscriber, i.e., the day and time of a call. In addition, the system described in this patent can route calls according to the calling line identification (e.g., refusing to take calls from certain numbers) and according to the urgency of the call (e.g., playing a prerecorded announcement indicating that only emergency calls are being taken, and asking if the call is an emergency and routing accordingly).

One drawback to the "service profile" approach is the difficulty in entering the data, especially from a telephone, which requires a complex interactive voice response interface. While a customer service representative can help create the service profile, perhaps using a desktop workstation and graphical user interface, use of a representative for this task is inefficient. Also, this approach is inflexible, requiring changes to the service profile should the subscriber change his or her pattern of activity either permanently or temporarily. Moreover, many subscribers are not sufficiently aware of their own pattern of activity to create an accurate schedule.

While the approach of having the system try a sequence of calls, i.e., the "find me" approach, is often effective, it is typically inefficient because it requires the caller to wait while the system rings three or four times at each number in the sequence. It is thus very desirable to have a method for using the "find me" approach that is both easy to set up and maintain and that can determine a sequence of numbers to call at a given time that minimizes the number of calls necessary to reach the subscriber.

SUMMARY OF THE INVENTION

Call-forwarding can be improved by systems and methods consistent with this invention that use a model of a subscriber's behavior to determine sequences of telephone instruments to forward calls. The sequences may vary according to the time of the day and the day of the week.

Systems and methods consistent with this invention employ the following steps to forward telephone calls: (a) receiving a call to a telephone number associated with a subscriber; (b) predicting, based on a model of the subscriber's behavior, likelihoods of the subscriber being located at sites corresponding to stored telephone numbers; and (c) determining a sequence of the stored telephone numbers according to the predicted likelihoods. The received call can then be forwarded to at least one of the stored telephone numbers according to the sequence.

The model of the subscriber's behavior may include weights determined from data representing previous calls connecting the subscriber when located at a site corresponding to at least one of the stored telephone numbers. The weights are used to order the stored telephone numbers according to the predicted likelihoods.

The model of the subscriber's behavior may be comprised of an abstract representation based on the subscriber's environment and actions with respect to receiving telephone calls. In this configuration, the model is examined for indications that the subscriber is located at the site corresponding to a particular telephone number.

The model of the subscriber's behavior may be comprised of a neural network. In this case the network is activated to determine indications that the subscriber is located at the site corresponding to a particular telephone number.

The model of the subscriber's behavior may be trained with data indicating previous calls connecting a caller successfully with the subscriber at each of the stored telephone numbers.

BRIEF DESCRIPTION OF THE DRAWINGS

The accompanying drawings, which are incorporated in and constitute a part of this specification, illustrate preferred embodiments of the invention and, together with the description, explain the goals, advantages and principles of the invention. In the drawings.

FIG. 5 shows the data structure of historical call information used for training the subscriber's behavior neural network in the preferred embodiment of a call-forwarding system consistent with the present invention;

DESCRIPTION OF THE PREFERRED EMBODIMENTS

Reference will now be made in detail to the preferred implementation of the present invention as illustrated in the accompanying drawings. Wherever possible, the same reference numbers will be used throughout the drawings and the following description to refer to the same or like parts.

Overview

Systems and methods consistent with this invention attempt to place telephone numbers in an order that minimizes the delay a caller experiences when a telephone call is forwarded, and minimizes the number of conversations the caller must have to learn that the subscriber is not available at a particular location. Systems and methods consistent with this invention do so by using an adaptive model, such as a neural network, trained to associate days of the week and times of the day during which a subscriber is at certain locations having telephone instruments reachable by calling specific telephone numbers. From this information, the system predicts the likelihood of the individual being at different locations given a day of the week and time of day.

Systems and methods consistent with this invention preferably obtain data to train the network from occurrences when a caller successfully locates the subscriber. The duration of the call typically affects the strength of training because the longer the call the more likely it is that the recipient is actually the person called, with calls below a certain threshold duration (e.g., 30 seconds) deemed to be especially unreliable data points. The system can also obtain data when the subscriber calls in to check voice-mail or performs other telephonic activities from a location corresponding to one of the forwarding telephone numbers.

Telephone Network

Figure 1:
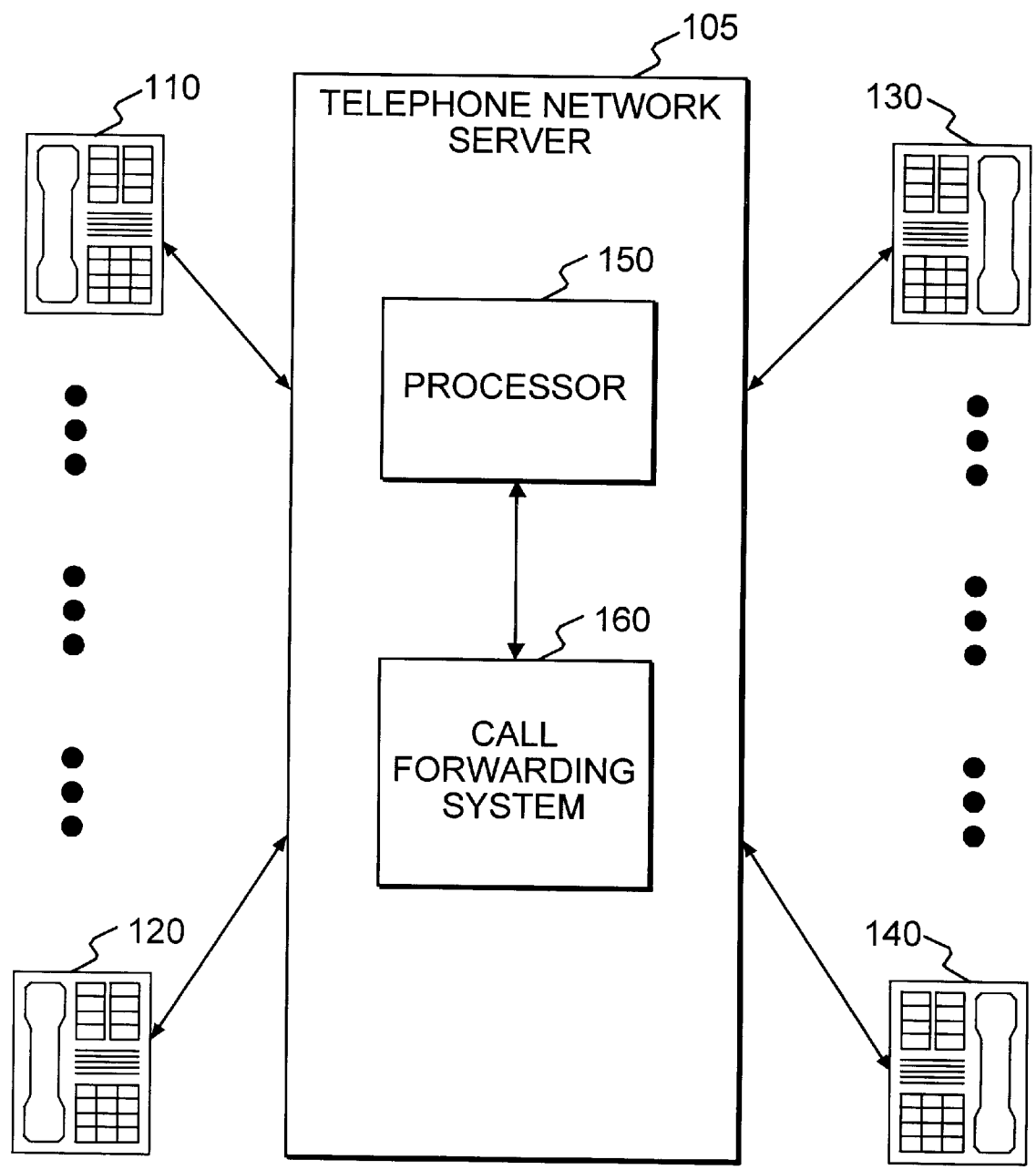
FIG. 1 is an illustration used to explain a preferred embodiment of a call-forwarding system consistent with the present invention.

FIG. 1 illustrates a telephone network 100 using a call-forwarding system consistent with the present invention. Network 100 includes multiple telephones 110, 120, 130, and 140 connected by a telephone network server 105. Telephone network server 105 includes processor 150 and call-forwarding system 160, and is typically operated by a telephony service provider such as AT&T, MCI, Sprint, or a Regional Bell Operating Company (RBOC).

Processor 150 not only performs standard network operations, for example, connecting calls, but it also performs operations for call-forwarding system 160. Such operations include forwarding calls to personal telephone numbers as described below. Telephone network 100 shows a simplified abstraction, and an actual system typically includes a large number of telephones and servers configured in a complex network.

Call-forwarding Operation

Figure 2:
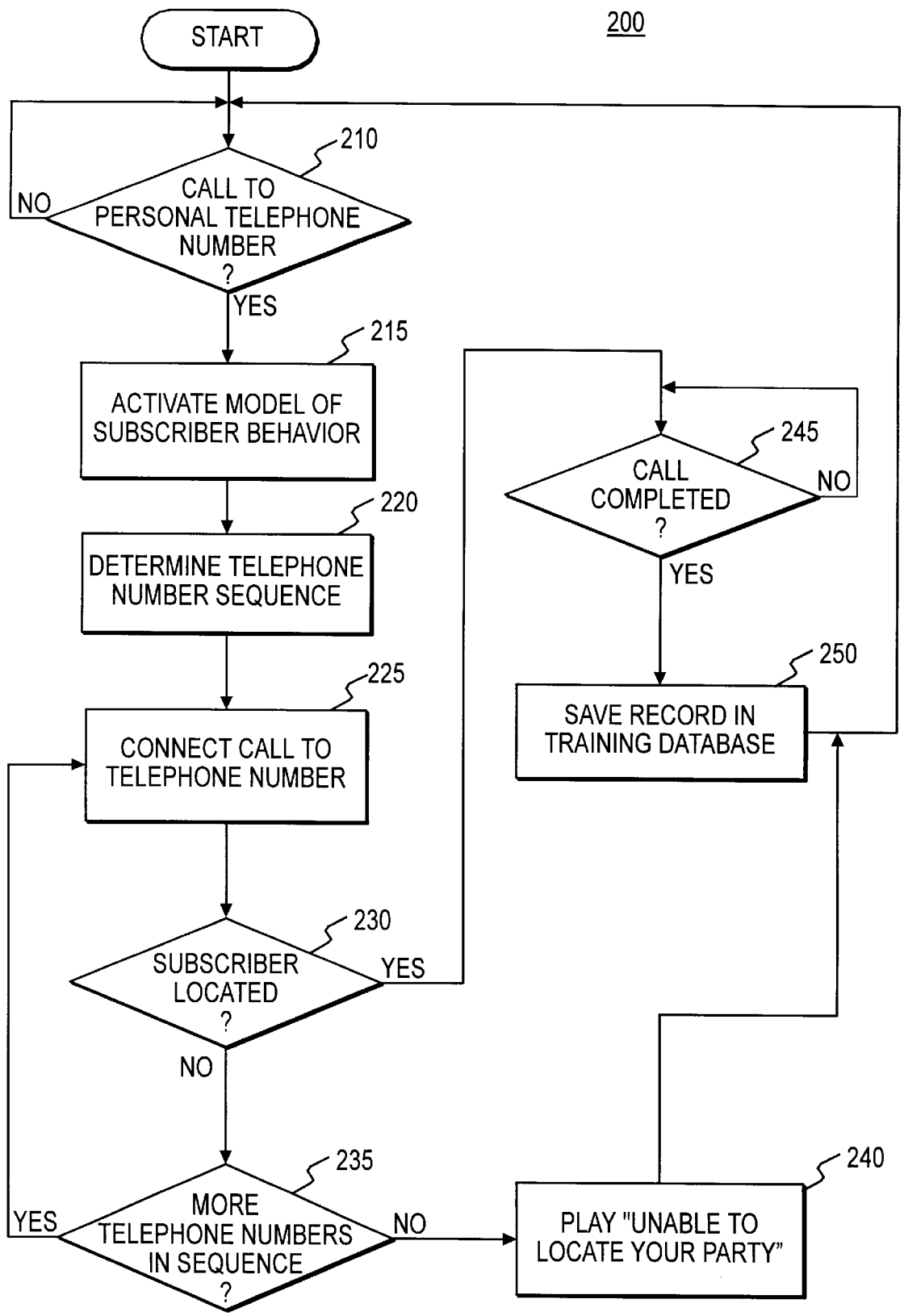
FIG. 2 is a functional flowchart of the process steps used to forward telephone calls to personal telephone numbers in the preferred embodiment of a call-forwarding system consistent with the present invention.

FIG. 2 is a flow chart of a procedure 200 used by call-forwarding system 160 to process calls to personal telephone numbers and forward those calls to actual telephone numbers. The steps of procedure 200 are preferably implemented in software that is executed by processor 150.

Procedure 200 assumes that a subscriber with a personal telephone number has previously created a database of actual telephone numbers. The database may be managed by server 105 and stored in memory (not shown) of server 105. The database can be created using a variety of different approaches. For example, the subscriber can call a special telephone number for setting up and modifying his database. When the subscriber calls the special telephone number, the system uses a voice synthesizer to tell the subscriber: "You have entered four numbers to forward calls to. Press 1 to hear a list of the numbers, press 2 to delete all numbers." If the subscriber then presses 1 on the telephone keypad, the system's voice synthesizer responds with "The first number is 408 565-7912. Press 1 for the next number, press 2 to delete this number, press 3 to enter a new number just after this number, press 4 to return to the previous menu." If the subscriber presses 3 in response to the second menu, the system responds with the message "Enter a new number now by keying it, followed by the pound sign." When the number is entered the system confirms it with the voice response "The new number entered is 202 408-4023. Press 1 to verify this is correct, or 2 if it is in error." Alternatively, a more sophisticated voice recognition systems can be used to modify the database of numbers using a similar approach.

Call-forwarding system 160 monitors all incoming calls and determines whether a call is to a subscriber's personal telephone number (step 210). All calls not to subscribers' personal telephone numbers are ignored. When determining that a received call is in fact to a specific subscriber's personal telephone number, system 160 activates a model of the subscriber's behavior (step 215). The model is a neural network used to predict the likelihood that a subscriber is at the location corresponding to each of the actual telephone numbers in the database. The likelihood is based on the history of subscriber's behavior encoded in the model and the current time of the day and day of the week when the call to the subscriber's personal telephone number is received. The actual telephone numbers from the database are then ordered in a sequence corresponding to the predicted likelihood that each corresponds to the subscriber's current location on the day and time that the call to his personal telephone number was received (step 220).

Telephone network server 105 then connects the call to the subscriber's personal telephone number to the actual telephone number in the sequence (step 225). If the subscriber is at the location for the first actual telephone number in the sequence (step 230), then call-forwarding system 160 monitors the call to determine when the call is completed (step 245). When the call is completed, i.e., when the subscriber hangs up, system 160 records information for a training database that is used to train the model of the subscriber's behavior (step 250), and returns to monitoring incoming calls.

The determination that the subscriber has been located (step 230) can take place several ways. For example, system 160 can allow the telephone to ring for a predetermined number of rings and conclude that the subscriber is not present if the call has not been answered during this period. Alternatively, if the length of the call is greater than a predetermined time period then the system 160 concludes that the subscriber is present. Those skilled in the art will be familiar with other methods for determining the presence of a subscriber at the receiving end of a call.

Additionally, system 160 may require that the length of a call be for at least a specific amount of time (e.g., 30 seconds) before saving a record in the training database. This avoids storing history records that do not assist in training the network.

If the subscriber was not located at the first telephone number tried (step 230), then system 160 determines whether there are any other telephone numbers in the sequence remain that have not yet been tried (step 235). If so, system 160 tries the next number in the sequence (step 225), which would be the next most likely telephone number. The system 160 repeats this process (steps 225, 230, and 235) until the subscriber is located or no numbers in the sequence remain. At that time, system 160 informs the caller that it is unable to locate the subscriber by using a voice synthesizer (or recorded voice) to play an appropriate message such as "UNABLE TO LOCATE YOUR PARTY" (step 240). The system also notifies the caller that he may leave a voice mail message if he so desires and transfers the call to a voice mail system if the caller remains on the line (not shown). In this manner, system 160 forwards calls to each subscriber's personal telephone number using a computational model of the subscriber's behavior.

Software Components

Figure 3:
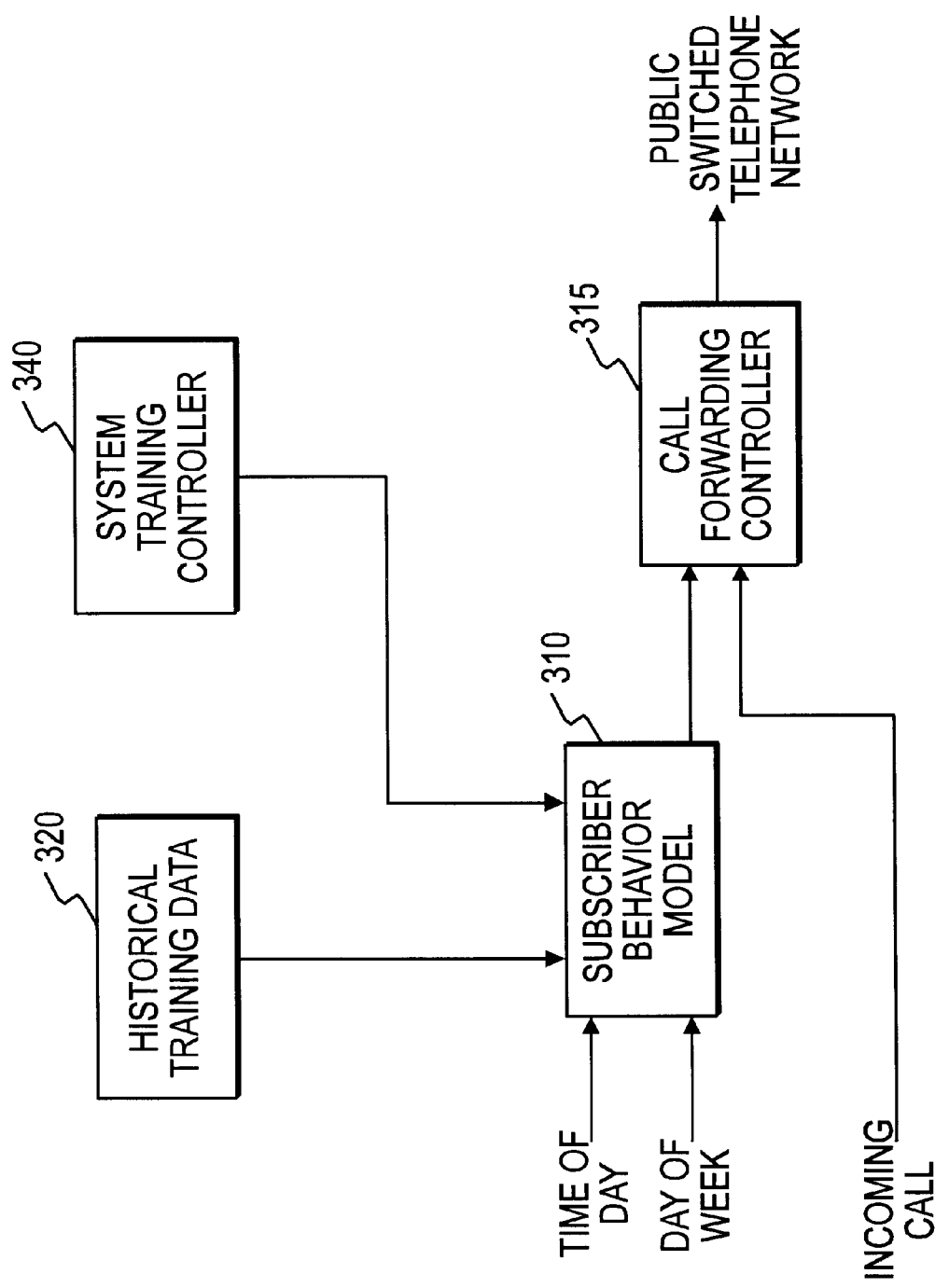
FIG. 3 is a block diagram of the software components of the preferred embodiment of a call-forwarding system consistent with the present invention.

FIG. 3 is a block diagram of a preferred implementation of call-forwarding system 160. System 160 consists of four components: a model of the subscriber's behavior 310, call-forwarding controller 315, historical training data 320, and system training controller 340.

Subscriber behavior model 310 preferably includes a neural network. When a caller dials the personal telephone number of a subscriber, this activates the network model 310 associated with that subscriber. Using information on the time of day and day of week, network model 310 produces a sequence of actual telephone numbers arranged in decreasing order of the likelihood of the individual being available at the location of a telephone corresponding to each telephone number. Each number is then tried in turn by call-forwarding controller 315 until the individual is located or the last number is tried unsuccessfully.

Historical training data 320 contains data to train the neural network when appropriate. System training controller 340 trains the network model 310 using historical training data 320. System training controller 340 is described in detail below with reference to FIGS. 5–7.

Subscriber's Behavior Model

Figure 4:
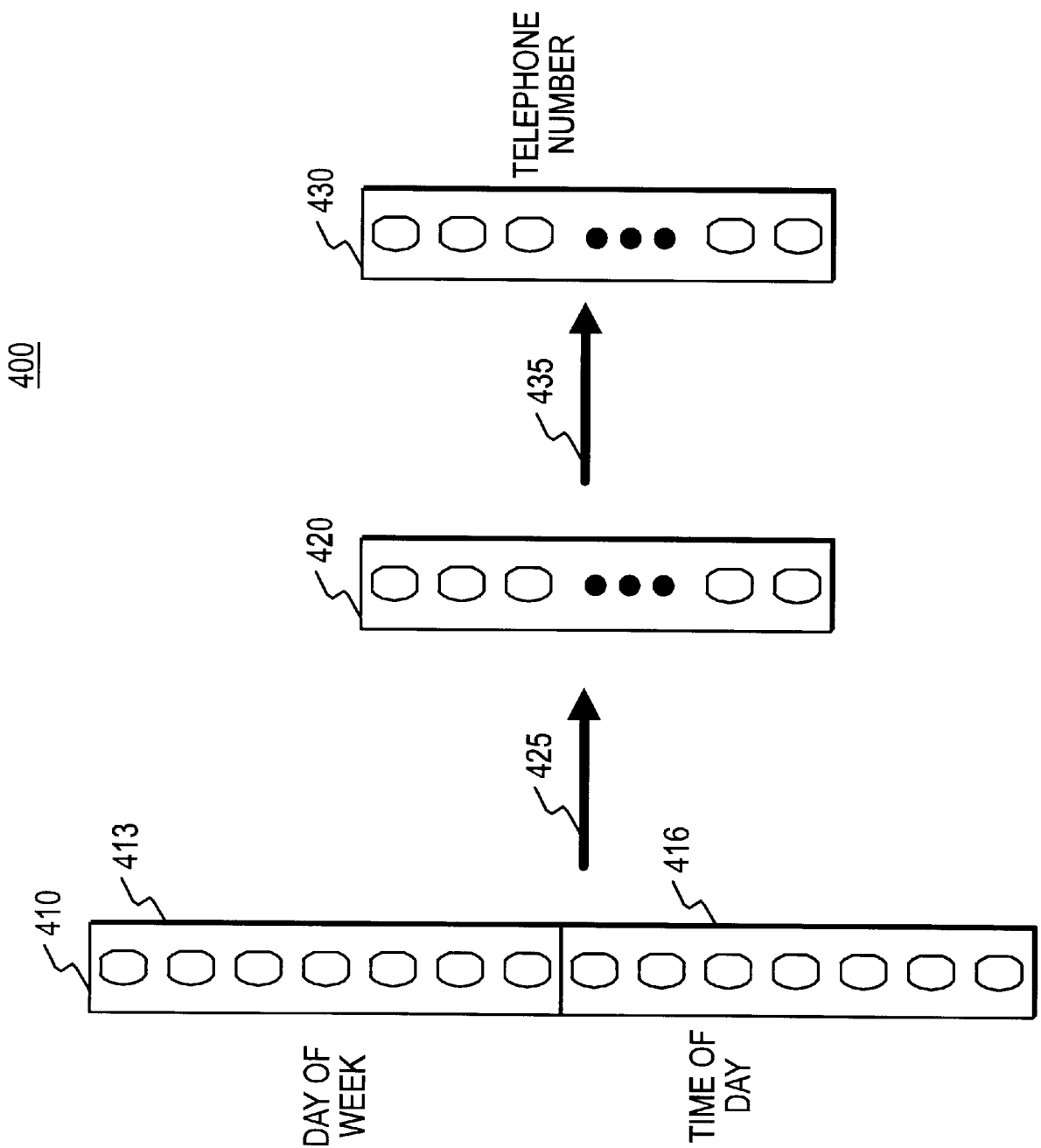
FIG. 4 is a diagram used to explain the architecture of a neural network that models the subscriber's behavior in the preferred embodiment of a call-forwarding system consistent with the present invention.

FIG. 4 shows the architecture of an exemplary neural network 400 for model 310 of the call-forwarding system 160. Network 400 is shown as a three-layer feedforward neural network, and consists of an input layer 410, a hidden layer 420, and an output layer 430. Such a network architecture is described in detail in the paper by D. E. Rumelhart, G. E. Hinton, and R. J. Williams, "Learning internal representations by error propagation," which is published in the book entitled "Parallel Distributed Processing: Explorations in the Microstructure of Cognition," J. E. McClelland, D. E. Rumelhart, and the PDP Research Group, Editors, Cambridge, Mass.: MIT Press, 1986, Vol. 1, pp. 318–362. This paper contains certain equations that describe the computation of the activity level of a unit from its inputs, the role of the weights of connections in such computations, and how the weights of connections are modified to allow the network to learn, as do textbooks on neural network architectures and applications.

Network 400 is preferably implemented by software, and input values are set to 0.0 for false and 1.0 for true. The software to simulate network 400 may be implemented in the C++ programming language using the Microsoft Visual C++® programming environment, including Microsoft Developer Studio® and Microsoft Foundation Class®, all running under the Windows 95® or Windows NT® operating systems.

A neural network consists of "units," or artificial neurons, that receive inputs through "connections" from other units that are essentially artificial resistors. Each such connection has a value known as a "weight" that can be considered analogous to the resistance of a resistor. Each unit sums the input signal values received from its inputs after being weighted by the connection, and then applies a nonlinear mathematical function to determine a value known as the "activity level" for that unit. After processing it through an output function, the result is applied, through the weighted connections, to units in the next highest layer. For example, the outputs of layer 410 are inputs to layer 420.

Input layer 410, with its input units, is actually a dummy layer in which the activity level for each input unit is simply set to the analog value provided as input to each unit. The output of each input unit is connected to the input of every unit in hidden layer 420. The large arrow 425 represents such full connections.

There are approximately as many units in the hidden layer 420 as there are telephone numbers that the subscriber can be reached at. Units in layer 420 are called "hidden units" because their values are not directly observable, unlike the units of input layer 410 and output layer 430. The output of each unit in hidden layer 420 is connected to the input of every unit in output layer 430.

The output of each output unit is provided to the rest of the system as the output of neural network 400. In a feedforward network, the flow of information in network 400 is in one direction only, from input layer 410 to hidden layer 420 and from hidden layer 420 to output layer 430, as arrows 425 and 435 show.

When information is applied to the input of network 400, it propagates to hidden layer 420 and then to output layer 430. The value of each output unit, each corresponding to a different number for reaching the subscriber, represents the likelihood that the subscriber can be reached at that number.

Input layer 410 consists of two groups of inputs 413 and 416. First group 413 encodes the current day of the week and consists of seven units, one for each day of the week. Second group 416 encodes the current time of day and consists of seven units, each indicating a time within one of the following seven categories: midnight-6 am, 6–9 am, 9–12 am, 12–1, 1–4 pm, 4–6 pm, and 6–12 pm.

Network 400 first determines the current day and time by means of the appropriate system call, such as GetLocalTime, a calling program in C++, and then codes this information by setting input values to the appropriate inputs.

The day of week and time of day inputs are not necessarily the most significant effects on calling behavior network 400 that result in an output. In many cases, network 400's most significant predictive capability comes from biasing toward or against specific numbers for subscribers without set schedules, such as sales persons making calls or those with flexible schedules. Day and time inputs become significant primarily when strong patterns occur involving these parameters, such as when people are reachable only at home on weekends, always stay late at the office on a particular night, or always make sales calls via automobile on a particular day or at particular times.

Alternatively, neural network 400 may include two layers of hidden units. The additional hidden layer requires an additional set of connections and weights. Each of the two layers has approximately the same number of hidden units, which approximates the number of telephone numbers the user can be reached at. The advantages of the additional layer are to allow the capture of more subtle interactions among specific numbers, times, and days, than is possible with a single hidden layer. The disadvantages includes additional processing capacity and memory required to implement the network, longer training times, and possibly less stable training.

There are two possible methods for training neural network 400: complete and incremental. Complete training is preferred. The high computational requirements for this type of training, however, prevent it from being used more than once per day. If network 400 is not immediately updated for calls received during each day, there may be a drop off in accuracy. To compensate for this problem, calls received on a particular day may be kept in memory of server 105, with the predicted probability of reaching the subscriber at a given telephone number calculated by a simple procedural algorithm. Calculation of the likelihood of a telephone number corresponding to a call in the server's memory may be done by simply setting the likelihood to 0.9 if the call has just been received and dropping the probability as a function of the time since the last successful call to the given number, and either ignoring the prediction made by the network 400 or adding the output of the procedural algorithm to that of the network. Otherwise, the prediction made by the network 400 would be used.

Incremental training is done after each call whenever it appears that the computer is not being heavily used and computational capacity is available, and consists of that additional training necessary to update network 400 to the just completed call or calls.

Training Data For Subscriber's Behavior Model

FIG. 5 shows a data structure 500 of historical call information saved for use in training behavior neural network 400. The columns 510, 520, 530, 540, and 550 show data recorded for each call. A record 560 includes for each call:

1) a date of the call;
2) a day of the week (0–6 records Monday through Sunday, respectively);
3) a time of day (0 if midnight-6 am, 1 if 6–9 am, 2 if 9–12 am, 3 if 12–1, 4 if 1–4 pm, 5 if 4–6 pm, and 6 if 6–12 pm.);
4) a telephone number (i.e., the stored number where the subscriber was reached); and
5) call duration (preferably measured in seconds).

Training Routine for Subscriber's Behavior Model

Figure 6:
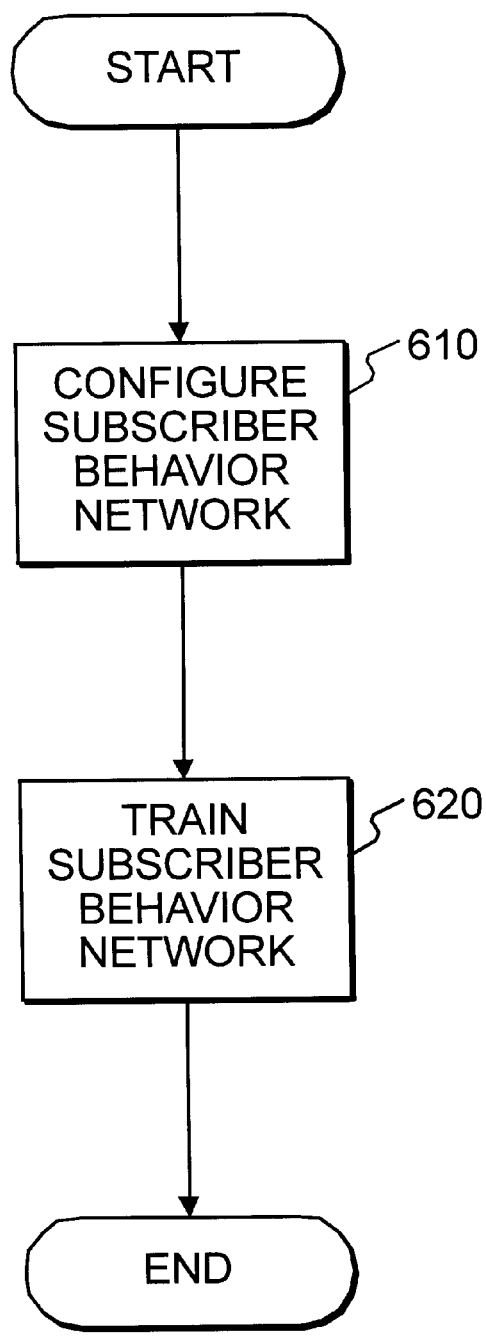
FIG. 6 is a flowchart of the steps performed by the system training controller in the preferred embodiment of a call-forwarding system consistent with the present invention.

FIG. 6 shows a flowchart of a procedure 600 used by call-forwarding system 160 to train neural network 400. The procedure 600 is part of system training controller 340 and is implemented in software.

When an individual subscribes to a service having the functions of call-forwarding system 160, the subscriber (or network operator) sets a parameter in system training controller 340 to indicate a daily time (e.g., 2 a.m.) that system training controller 340 trains neural network 400. This time should be chosen to avoid periods when processor 150 is in use. When the appropriate time is reached, controller 340 makes a copy of the weights of the network in case an incoming call requires the network to be activated while the network is being trained. Once training has been successfully completed, the copy is deleted and the new weights recorded as the network for use for the given subscriber. If network 400 is available for training, controller 340 configures the network architecture for the behavior network (step 610). This is done by determining the number of actual telephone numbers in the database, and constructing a network with the appropriate number of hidden units, output units, and connections between the input layer and hidden layer and between the hidden layer and output layer. The exact number of hidden units can be adjusted to yield the best generalization performance. Rules based on these adjustments are encoded in the architecture configuration and learning part of the eventual product. The number of hidden units must be substantially less than the number of combinations of telephone numbers crossed with the alternative times, etc., so as to force the network to generalize.

Next, controller 340 trains the behavior network (step 620).

Figure 7:
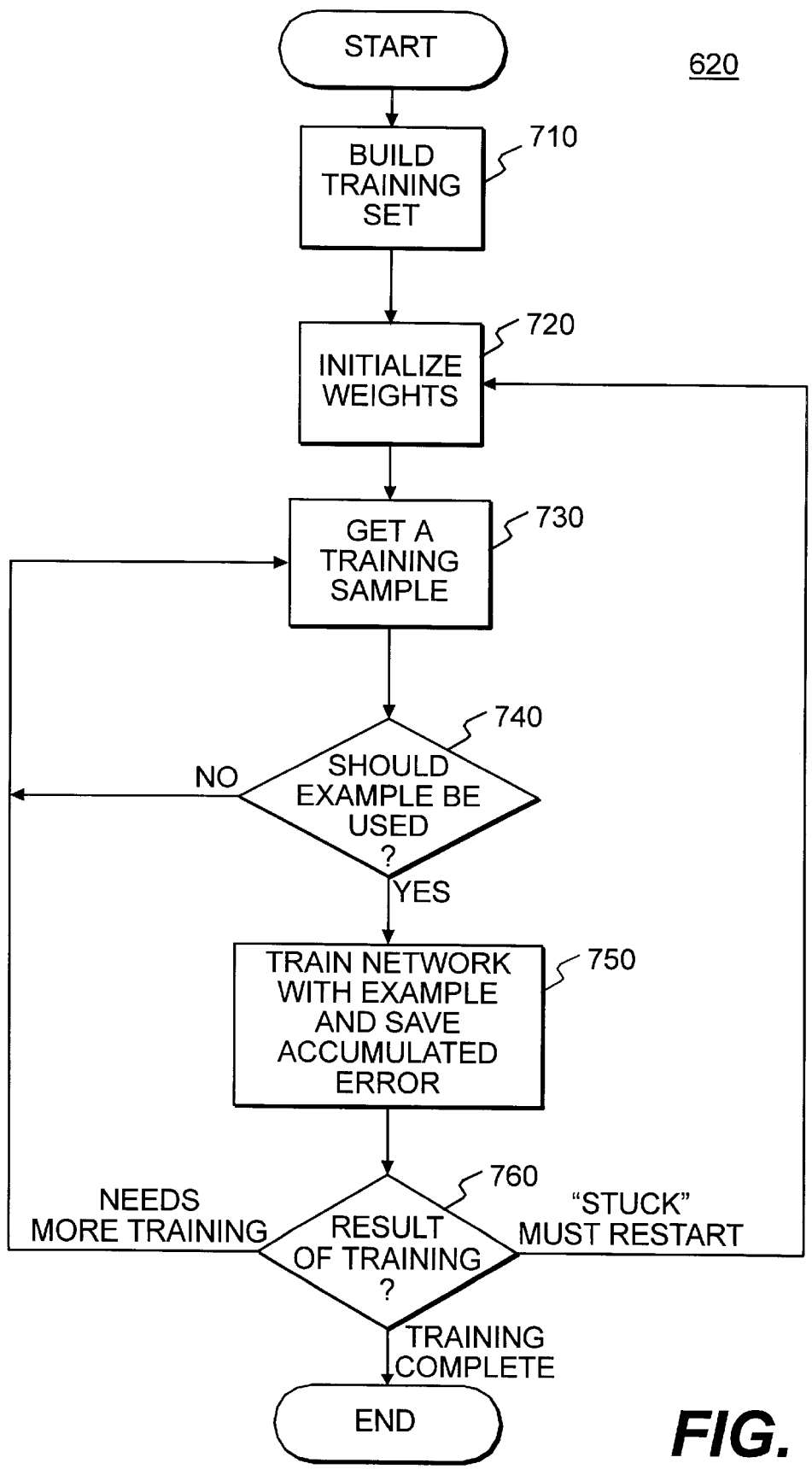
FIG. 7 is a flowchart of the steps used when the preferred embodiment of the call-forwarding system of the present invention trains the subscriber's behavior neural network.

FIG. 7 shows a flowchart describing the steps for training subscriber's behavior network 400 (see step 620 of FIG. 6).

When initiated, controller 340 first builds a training set from historical training data shown in FIG. 5 (step 710). This historical training data is stored in a database file. Each record in the historical database is converted to an example for training.

The following fields are preferably defined in the set of training examples: day, time, telephone number, selection probability, and the number of records for the given telephone number. The day and time are provided to the network input layer when training, and the telephone number is provided at the output layer of the network 400 for use by the learning algorithm. The selection probability is a parameter that defines the probability that the example will, at any given cycle through the training procedure, be selected as a training example. It has a value between 0.002 to 1.00. The number of records, and thus examples for the given telephone number, is needed to determine the extent to which the inputs are set to random values, rather than the actual day of the week and time of day. This setting of inputs to random values is necessary when relatively few records exist for a given telephone number, preventing the network from generalizing sufficiently to output the given telephone number if the input values are different from those for the existing records.

For example, if a single record exists of a call to a number at 12 noon on Tuesday, the network, if trained with only this data, would have a substantial output value for the given telephone number only if the input specified noon on Tuesday. Such behavior of the network is unreasonable given such a small amount of data. If 50 records existed for the same number at diverse times and days, a reasonable output value would be likely for that number with inputs at nearly any time and day. If 50 records existed for the same number, all at noon on Tuesday, the network would again be responsive for the given number only at that time and day, but quite legitimately so, given the history of calls.

The selection probability is computed as follows:

$$P_{selection} = X_{age} * X_{duration},$$

where $X_{age}$ ranges from 0.01 to 1.0 and $X_{duration}$ ranges from 0.20 to 1.00. $P_{selection}$ thus has possible values from 0.002 to 1.00.

$X_{age}$ specifies the number of days between the call being made and the network being trained. The values are assigned as follows: 0.01 if the call was made over a year ago, 0.02 if the call was made 181–365 days ago, 0.04 if the call was made 91–180 days ago, 0.08 if the call was made 31–90 days ago, 0.15 if the call was made 10–30 days ago, 0.30 if the call was made 4–9 days ago, 0.60 if the call was made 2–3 days ago, and 1.0 if the call was made yesterday.

The value of $X_{duration}$ depends on both the circumstances of the call and the actual duration. For calls that locate the subscriber, $X_{duration}$ is assigned as follows: 1.0 if duration >60 minutes; 0.8 if 11–60 minutes, 0.6 if 2–10 minutes, 0.4 if 30–119 seconds, and 0.20 if 15–30 seconds. If the call duration is less than 15 seconds, the record is discarded as unreliable.

After the training set has been constructed (step 710), the set of weights for the connections between units of the network is then set to random values to initialize the network 400 (step 720). A training example is then obtained from the training set (step 730). This training example is the first in the set if the weights have just been initialized. Otherwise, the next example in the set is selected. If there are no more examples in the set (as the result of the previous training example being the last in the set), the first example in the set is selected.

A calculation is then made to determine whether the example just selected is actually used to train the network on the current pass (step 740). The selection probability for the example is retrieved, and a random number from 0 to 1.0 is generated and compared with the selection probability. Only if the number is less than or equal to the selection probability is the example used.

For example, if the selection probability is 0.5, then the example is only used when the random number generated is from 0 to 0.5, or 50% of the time. If the selection probability is 0.1, then the example is only used when the random number is from 0 to 0.1, or 10% of the time. If the example is not used, control is passed to obtain another training example (step 730).

Otherwise, the network 400 is trained with the example and the accumulated error saved (step 750). This is done by first providing the input of the network 400 with the appropriate input signals. These can be either the actual inputs for the example or, as suggested above, randomized inputs.

When training begins, a parameter known as the input randomization probability cutoff, $P_{cutoff}$, is calculated according to the following formula:

$$P_{cutoff} = N_{records}/N_{combinations},$$

where $N_{records}$ is the number of records for this number in the historical database, and $N_{combinations}$ is the number of input combinations, which equals the number of levels of the day of week multiplied by the number of levels of the time of day input. For the network shown, $N_{combinations} = 7 \times 7 = 49$.

A random number from 0 to 1 is generated for each example and compared with the input randomization probability cutoff, $P_{cutoff}$. If the number is less than $P_{cutoff}$, a random number from 1 to 7 is generated to input to the time of day units, and a separate random number from 1 to 7 is generated to input to the day of week units. If the random number is equal to or greater than $P_{cutoff}$, the actual inputs from the example are fed to the input units of the network.

Thus, for example, if only 1 record was available, $P_{cutoff}$ would be 1/49, or about 0.02, and the network 400 would be trained with a random date and time for 98% of the training trials (on average). For 49 available records, $P_{cutoff}$ would be 49/49=1.0, and the network 400 would be trained with the actual date and time essentially all of the time.

Training is done by applying the example to the appropriate inputs and outputs of the network 400, then using the backward propagation learning algorithm to modify the values of the weights of the connections in the network 400. Details of the backward propagation algorithm are described in the Rumelhart, Hinton, and Williams paper, which was referred to above. In this training, a set of data is used that includes both input and output data.

Thus, for example, a particular piece of data might consist of the day of the week and the time of day for inputs and a telephone number as output. The input data to the input layer are entered by setting the input unit matching the output from the example to 1.0, or "true," and setting all other input units to 0.0, or "false." Thus, in the case of the day of the week "Tuesday", the input unit corresponding to "Tuesday" is set to 1.0, while the other 6 input units are set to 0.0.

The telephone number for each trial is then effectively applied to the output units using the following steps. First, information is applied to the inputs of the network and then allowed to propagate through the network to the output units. Next, a calculation is made of the "error" of the network for each output unit by subtracting the actual output (activity level) of each unit from either 1.0, if the unit corresponds to the telephone number associated with the given trial, or 0.0. This error value is then "propagated backward" through the earlier layers of the network 400, by systematically changing the values of the weights according to the backward propagation learning algorithm in such a manner as to reduce the error. A given set of data is applied repeatedly to a network 400 until overall error is reduced to the point that the network 400 is considered trained.

The "accumulated error" is determined by summing the error for all output units across all training examples. The error for each unit is equal to the desired output value minus the actual output value. After training the network 400 with an example, a test is made of the result of the training thus far (step 760). The backward propagation learning algorithm is a "hill-climbing" algorithm. It uses a computation based on local information to seek a global minimum of error.

Such an algorithm can become "stuck," however. Networks may oscillate, continuing to learn for a short period but then falling back. The accumulated error after training is tested against a threshold level below which the network 400 is considered fully trained. If the error is above the threshold and the number of training trials is below a maximum, the network 400 needs more training. If the error is above the threshold and the maximum allowed number of training trials have been reached, the network 400 is considered "stuck." In general, the complexity of the problem is low and it is unlikely that the network 400 will become stuck. Because certain sets of random weight values can cause a network to become stuck even with problems of low complexity, it is necessary to test for this condition and respond to it.

If network 400 needs more training (step 760), control returns to obtain another training example (step 730). If the network 400 is "stuck," control passes to initialize the weights and begin the training process from the beginning (step 720). If the network 400 has its accumulated error below the threshold, then the training is completed.

Conclusion

Systems consistent with the present invention thus improve the accuracy of call-forwarding for personal telephone numbers using adaptive models such as neural networks of behavior of individuals corresponding to the assigned personal telephone numbers. When a call to an assigned personal telephone number is received, the call is forwarded to a telephone at a specific location by translating the personal telephone number into the actual telephone number for the telephone at that location. This "translation" process includes using the model of the behavior of the party being called (i.e., the individual with the personal telephone number) to determine the likelihood that the individual is currently at the location for the telephone with the actual telephone number. The present invention may also be used in a more conventional call-forwarding system in which the number called is that of a physical telephone line rather than a personal telephone number.

The foregoing description of a preferred embodiment of the invention has been presented for purposes of illustration and description. It is not intended to be exhaustive or to limit the invention to the precise form disclosed. For example, the technique is also applicable to call-forwarding systems in which a user has created a set of telephone numbers for a call to be forwarded to. This is initiated either by the user choosing a "Send All Calls" function, or by the user setting up a procedure in which his or her usual telephone number is rung a certain number of times, after which the call is forwarded if the call is not answered. The technique can also be used in a call-forwarding system that is integrated with a multipurpose telephony application that makes use of automatic speech recognition to perform such tasks as voice activated dialing, call management, and other services, in which users are likely to call into a central number to activate these services. Such users can then control call-forwarding, including selecting forwarding by means of the predictive neural network, with the system determining (by caller ID) the location of the user whenever a call is made into the central number. Alternatively, the call-forwarding technique according to the present invention may be implemented by a PBX system, such as the Nortel Meridian 1 PBX system. In this alternative, for example, a call to an individual's telephone connected by the PBX systems is forwarded to other connected telephones based on the individual's behavior. Other modifications and variations are possible in light of the above teachings or may be acquired from practice of the invention. The scope of the invention is defined by the claims and their equivalents.

What is claimed is:

1. A method for forwarding a telephone call comprising the steps of:

receiving a call to a telephone number associated with a subscriber;

predicting, based on a model of the subscriber's calling behavior, likelihoods of the subscriber being at locations corresponding to stored telephone numbers by applying weights associated with the telephone numbers such that recent calling behavior is favored over previous calling behavior; and determining a sequence of the stored telephone numbers according to the predicted likelihoods.

2. The method of claim 1 further comprising the step of:

forwarding the received call to at least one of the stored telephone numbers according to the sequence.

3. The method of claim 1, wherein the model of the subscriber's behavior includes weights determined from data representing previous calls connecting the subscriber when located at a location corresponding to at least one of the stored telephone numbers, and wherein the determining step includes the substep of:

applying the weights to order the stored telephone numbers according to the predicted likelihoods.

4. The method of claim 1, wherein the model of the subscriber's behavior comprises a representation based on the subscriber's environment and actions with respect to receiving telephone calls, and wherein the predicting step includes the substep of:

examining an abstract representation for indications that the subscriber is located at the location corresponding to a particular telephone number.

5. The method of claim 1, wherein the model of the subscriber's behavior comprises a neural network and wherein the predicting step includes the substep of:

activating the neural network to determine indications that the subscriber is located at the location corresponding to a particular telephone number.

6. The method of claim 1, further comprising the step of:

training the model of the subscriber's behavior with data indicating previous calls connecting a caller successfully with each of the stored telephone numbers.

7. The method of claim 1, further comprising the steps of:

creating a training set including information related to at least one previous received call; and modifying the model of the subscriber's behavior in accordance with the training set.

8. The method of claim 7, wherein the model of the subscriber's behavior includes weights determined from data representing previous calls connecting the subscriber when located at a location corresponding to at least one of the stored telephone numbers, and wherein the modifying step includes the substep of:

altering the weights of the subscriber's behavior model to reflect the information related to the previous call.

9. The method of claim 1 further comprising the step of:

forwarding the received call to each of the stored telephone numbers according to the sequence.

10. The method of claim 9, wherein the forwarding step includes the substep of:

determining whether the subscriber is located at a location associated with the telephone number to which the received call was forwarded.

11. The method of claim 1, wherein the determining step includes the substep of:

deleting telephone numbers from the sequence that are below a threshold predicted likelihood.

12. The method of claim 11 further comprising the step of:

forwarding the received call to each of the stored telephone numbers according to the sequence.

13. The method of claim 12, wherein the forwarding step includes the substep of:

determining whether the subscriber is located at a location associated with the telephone number to which the received call was forwarded.

14. A system for forwarding a telephone call comprising:

means for receiving a call to a telephone number associated with a subscriber;

means for predicting, based on a model of the subscriber's calling behavior, likelihoods of the subscriber being at locations corresponding to stored telephone numbers by applying weights associated with the telephone numbers such that recent calling behavior is favored over previous calling behavior; and means for determining a sequence of the stored telephone numbers according to the predicted likelihoods.

15. The system of claim 14 further comprising:

means for forwarding the received call to at least one of the stored telephone numbers according to the sequence.

16. The system of claim 14, wherein the model of the subscriber's behavior includes weights determined from data representing previous calls connecting the subscriber when located at a location corresponding to at least one of the stored telephone numbers, and wherein the determining means includes:

means for applying the weights to order the stored telephone numbers according to the predicted likelihoods.

17. The system of claim 14, wherein the model of the subscriber's behavior comprises a representation based on the subscriber's environment and actions with respect to receiving telephone calls, and wherein the predicting means includes:

means for examining an abstract representation for indications that the subscriber is located at the location corresponding to a particular telephone number.

18. The system of claim 14, wherein the model of the subscriber's behavior comprises a neural network and wherein the predicting means includes:

means for activating the neural network to determine indications that the subscriber is located at the location corresponding to a particular telephone number.

19. The system of claim 14, further comprising:

means for training the model of the subscriber's behavior with data indicating previous calls connecting a caller successfully with each of the stored telephone numbers.

20. The system of claim 14, further comprising:

means for creating a training set including information related to at least one previous received call; and means for modifying the model of the subscriber's behavior in accordance with the training set.

21. The system of claim 20, wherein the model of the subscriber's behavior includes weights determined from data representing previous calls connecting the subscriber when located at a location corresponding to at least one of the stored telephone numbers, and wherein the modifying means includes:

means for altering the weights of the subscriber's behavior model to reflect the information related to the previous call.

22. The system of claim 14 further comprising:

means for forwarding the received call to each of the stored telephone numbers according to the sequence.

23. The system of claim 22, wherein the forwarding means includes:

means for determining whether the subscriber is located at a location associated with the telephone number to which the received call was forwarded.

24. The system of claim 14, wherein the determining means includes:

means for deleting telephone numbers from the sequence that are below a threshold predicted likelihood.

25. The system of claim 24 further comprising:

means for forwarding the received call to each of the stored telephone numbers according to the sequence.

26. The system of claim 25, wherein the forwarding means includes:

means for determining whether the subscriber is located at a location associated with the telephone number to which the received call was forwarded.

27. A computer program product comprising:

a computer usable medium having computer readable code embodied therein for forwarding a telephone call, the computer usable medium comprising:

a receiving module configured to receive a call to a telephone number associated with a subscriber;

a predicting module configured to predict, based on a model of the subscriber's behavior, likelihoods of the subscriber being at locations corresponding to stored telephone numbers by applying weights associated with the telephone numbers such that recent subscriber behavior is favored over previous subscriber behavior; and a determining module configured to determine a sequence of the stored telephone numbers according to the predicted likelihoods.

28. The computer program product of claim 27 further comprising:

a forwarding module configured to forward the received call to at least one of the stored telephone numbers according to the sequence.

29. The computer program product of claim 27, wherein the model of the subscriber's behavior includes weights determined from data representing previous calls connecting the subscriber when located at a location corresponding to at least one of the stored telephone numbers, and wherein the determining module includes:

an applying module configured to apply the weights to order the stored telephone numbers according to the predicted likelihoods.

30. The computer program product of claim 27, wherein the model of the subscriber's behavior comprises a representation based on the subscriber's environment and actions with respect to receiving telephone calls, and wherein the predicting module includes:

an examining module configured to examine an abstract representation for indications that the subscriber is located at the location corresponding to a particular telephone number.

31. The computer program product of claim 27, wherein the model of the subscriber's behavior comprises a neural network and wherein the predicting module includes:

an activating module configured to activate the neural network to determine indications that the subscriber is located at the location corresponding to a particular telephone number.

32. The computer program product of claim 27, further comprising:

a training module configured to train the model of the subscriber's behavior with data indicating previous calls connecting a caller successfully with each of the stored telephone numbers.

33. The computer program product of claim 27, further comprising:

a training set building module configured to build a training set including information related to at least one previous call; and a modifying module configured to modify the model of the subscriber's behavior in accordance with the training set.

34. The computer program product of claim 33, wherein the model of the subscriber's behavior includes weights determined from data representing previous calls connecting the subscriber when located at a location corresponding to at least one of the stored telephone numbers, and wherein the modifying module includes:

an altering module configured to alter the weights of the subscriber's behavior model to reflect the information related to the previous call.

35. The computer program product of claim 27 further comprising:

a forwarding module configured to forward the received call to each of the stored telephone numbers according to the sequence.

36. The computer program product of claim 27, wherein the forwarding module includes:

a determining module configured to determine whether the subscriber is located at a location associated with the telephone number to which the received call was forwarded.

37. The computer program product of claim 27, wherein the determining module includes:

a deleting module configured to delete telephone numbers from the sequence that are below a threshold predicted likelihood.

38. The computer program product of claim 37 further comprising:

a forwarding module configured to forward the received call to each of the stored telephone numbers according to the sequence.

39. The computer program product of claim 38, wherein the forwarding module includes:

a determining module configured to determine whether the subscriber is located at a location associated with the telephone number to which the received call was forwarded.

40. A computer program product comprising a computer usable medium having computer readable code embodied therein for forwarding telephone calls, comprising a predictive model of a subscriber's behavior including a representation based on the subscriber's environment and actions with respect to receiving telephone calls, wherein the predictive model is used to predict likelihoods of the subscriber being at locations corresponding to schedule-independent telephone numbers by applying weights associated with the telephone numbers such that recent subscriber behavior is favored over previous subscriber behavior and to determine a sequence of the numbers according to the predicted likelihoods.

41. A method for forwarding a telephone call comprising the steps of:

receiving a telephone call to a subscriber;

predicting, likelihoods of the subscriber being at locations corresponding to schedule-independent telephone numbers based on a predictive model of the subscriber's behavior based on the subscriber's environment and actions by applying weights associated with the telephone numbers such that recent subscriber behavior is favored over previous subscriber behavior; and forwarding the telephone call to at least one of the schedule-independent telephone numbers according to the predicted likelihoods.

42. A method for forwarding a telephone call comprising the steps of:

receiving a call to a telephone number associated with a subscriber;

predicting, based on a model of the subscriber's calling behavior, likelihoods of the subscriber being at locations corresponding to stored telephone numbers, wherein the model of the subscriber's behavior comprises a neural network activated to determine whether the subscriber is located at the location corresponding to a particular telephone number; and determining a sequence of the stored telephone numbers according to the predicted likelihoods.

43. A system for forwarding a telephone call comprising:

means for receiving a call to a telephone number associated with a subscriber;

means for predicting, based on a model of the subscriber's calling behavior, likelihoods of the subscriber being at locations corresponding to stored telephone numbers, wherein the model of the subscriber's behavior comprises a neural network activated to determine whether the subscriber is located at the location corresponding to a particular telephone number; and means for determining a sequence of the stored telephone numbers according to the predicted likelihoods.

* * * * *